US006948156B2

(12) United States Patent
Sokolov

(10) Patent No.: US 6,948,156 B2
(45) Date of Patent: Sep. 20, 2005

(54) TYPE CHECKING IN JAVA COMPUTING ENVIRONMENTS

(75) Inventor: Stephan Sokolov, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 649 days.

(21) Appl. No.: 09/999,519

(22) Filed: Oct. 24, 2001

(65) Prior Publication Data

US 2003/0079201 A1 Apr. 24, 2003

(51) Int. Cl.[7] .................................................. G06F 9/45
(52) U.S. Cl. ...................................................... 717/136
(58) Field of Search ................................ 717/116, 146, 717/148, 118; 718/1; 719/316; 709/315

(56) References Cited

U.S. PATENT DOCUMENTS

| | | | | |
|---|---|---|---|---|
| 5,367,685 A | * | 11/1994 | Gosling | 717/148 |
| 6,557,023 B1 | * | 4/2003 | Taivalsaari | 718/1 |
| 6,560,774 B1 | * | 5/2003 | Gordon et al. | 717/146 |
| 6,581,206 B2 | * | 6/2003 | Chen | 717/143 |
| 6,711,576 B1 | * | 3/2004 | Tuck et al. | 707/100 |
| 6,714,991 B1 | * | 3/2004 | Bak et al. | 719/316 |
| 2002/0199169 A1 | * | 12/2002 | Sokolov et al. | 717/116 |
| 2003/0014555 A1 | * | 1/2003 | Cierniak | 709/315 |
| 2004/0015850 A1 | * | 1/2004 | Sokolov et al. | 717/116 |

OTHER PUBLICATIONS

Vitek et al., "Efficient Type Inclusion Tests," ACM, 1997.*
Goldberg, "A Specification of Java Loading and Bytecode Verification," ACM, 1998.*
Knoblock et al., "Type Elaboration and Subtype Completion for java Bytecode," ACM, 2000.*

Dattatri, "C++:Effective Object–Oriented Software Construction," Prentice Hall, 2000, pp. 568–575.*

Aho et al., "Compilers: Principles, Techniques, and Tools," Addison–Wesley, 1986, chapters 6 and 7.*

Qualline, Practical C++ Programming, O'Reilly & Associates, pp. 227–247, 1997.*

Dave Marshall, "Pointers," May 1999, <http://web.archive.org/web/19990508132024./http://www.cs.cf.ac.uk/Dave/C/node 10.html>.*

Lindholm et al., "The Java™ Virtual Machine Specification," (Sep., 1996), Sun Microsystems, Inc., Chapters 1–10 (173 pp.).

* cited by examiner

*Primary Examiner*—Kakali Chaki
*Assistant Examiner*—Insun Kang
(74) *Attorney, Agent, or Firm*—Beyer Weaver & Thomas, LLP

(57) ABSTRACT

Techniques for checking in JAVA™ computing environments are disclosed. The techniques can be used by a JAVA™ virtual machine to efficiently perform type checking. A JAVA™ class hierarchy which represents the hierarchical relationship of parent classes of JAVA™ class can be implemented as an array of class references. The array of class references can be used to efficiently perform type checking in JAVA™ computing environments. As a result, the performance of JAVA™ virtual machines, especially those operating with limited resources, is significantly enhanced.

17 Claims, 5 Drawing Sheets

TYPE CHECKING IN JAVA COMPUTING ENVIRONMENTS

BACKGROUND OF THE INVENTION

The present invention relates generally to JAVA™ programming environments, and more particularly, to frameworks for generation of JAVA™ macro instructions in JAVA™ computing environments.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web") which is an interface protocol for the Internet that allows communication between diverse computer platforms through a graphical interface. Computers communicating over the Web are able to download and execute small applications called applets. Given that applets may be executed on a diverse assortment of computer platforms, the applets are typically executed by a JAVA™ virtual machine.

Recently, the JAVA™ programming environment has become quite popular. The JAVA™ programming language is a language that is designed to be portable enough to be executed on a wide range of computers ranging from small devices (e.g., pagers, cell phones and smart cards) up to supercomputers. Computer programs written in the JAVA™ programming language (and other languages) may be compiled into JAVA™ Bytecode instructions that are suitable for execution by a JAVA™ virtual machine implementation. The JAVA™ virtual machine is commonly implemented in software by means of an interpreter for the JAVA™ virtual machine instruction set but, in general, may be software, hardware, or both. A particular JAVA™ virtual machine implementation and corresponding support libraries together constitute a JAVA™ runtime environment.

Computer programs in the JAVA™ programming language are arranged in one or more classes or interfaces (referred to herein jointly as classes or class files). Such programs are generally platform, i.e., hardware and operating system, independent. As such, these computer programs may be executed, without modification, on any computer that is able to run an implementation of the JAVA™ runtime environment.

Object-oriented classes written in the JAVA™ programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the JAVA™ virtual machine) is described in some detail in *The JAVA™ Virtual Machine Specification. Second Edition,*by Tom Lindholm and Frank Yellin, which is hereby incorporated herein by reference.

FIG. 1A shows a progression of a simple piece of a JAVA™ source code 101 through execution by an interpreter, the JAVA™ virtual machine. The JAVA™ source code 101 includes the classic Hello World program written in JAVA™. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler 103 outputs a JAVA™ class file 105 that includes the Bytecodes for the JAVA™ program. The JAVA™ class file 105 is input into a JAVA™ virtual machine 107. The JAVA™ virtual machine 107 is an interpreter that decodes and executes the Bytecodes in the JAVA™ class file. The JAVA™ virtual machine is an interpreter, but is commonly referred to as a virtual machine as it emulates a microprocessor or computer architecture in software (e.g., the microprocessor or computer architecture may not exist in hardware).

FIG. 1B illustrates a simplified class file 100. As shown in FIG. 1B, the class file 100 includes a constant pool 102 portion, interfaces portion 104, fields portion 106, methods portion 108, and attributes portion 110. The methods portion 108 can include, or have references to, several JAVA™ methods associated with the JAVA™ class which are represented in the class file 100.

During the execution of JAVA™ programs, there may often be a need to type check a JAVA™ class against another JAVA™ class. Type checking is performed, for example, during a casting operation when a first reference to a JAVA™ class is set to a second. Casting is valid if the second reference points to the same class or a parent of that class in its class hierarchy. Accordingly, there is a need to determine whether the second reference is of a class type which is a parent of the class referenced by the first reference. Unfortunately, however, this determination can require several operations to be performed. Typically, a field in the internal class representation is reserved to reference the parent of the class (i.e., an internal representation of the parent class). The parent internal representation, in turn, has a field that references an internal representation for its parent class, and so on. Following references from one internal class representation to another can be an expensive operation especially when the internal class representations have to be loaded in and out of the memory. This inefficiency significantly hinders the performance of JAVA™ virtual machines, especially those operating with limited memory and/or limited computing power (e.g., embedded systems).

In view of the foregoing, there is a need for improved techniques to perform type checking in JAVA™ computing environments.

SUMMARY OF THE INVENTION

Broadly speaking, the invention relates to improved techniques for type checking in JAVA™ computing environments. As will be appreciated, the techniques can be used by a JAVA™ virtual machine to efficiently perform type checking. In one embodiment, a JAVA™ class hierarchy is implemented in an internal class representation. The JAVA™ class hierarchy represents the hierarchical relationship of the parent classes for the JAVA™ class. The JAVA™ class hierarchy can be implemented, for example, as an array of class references. The array of class references can be used to efficiently perform type checking in JAVA™ computing environments. As a result, the performance of JAVA™ virtual machines, especially those operating with limited resources, can be significantly enhanced.

The invention can be implemented in numerous ways, including as a method, an apparatus, and a computer readable medium. Several embodiments of the invention are discussed below.

As an internal class representation suitable for representation of a JAVA™ class in a JAVA™ virtual machine, the internal class representation comprising: a JAVA™ class hierarchy for the JAVA™ class, wherein the JAVA™ class hierarchy represents all the parent classes of the JAVA™ classes in a hierarchical relationship.

As a method of type checking JAVA™ class types, one embodiment of the invention comprises the acts of: receiving a first and a second reference, the first and second references respectively referencing a first and a second JAVA™ class, finding a class representation for the first JAVA™ class, the class representation including a JAVA™ class hierarchy for the first JAVA™ class, the JAVA™ class hierarchy including all the parents of the first JAVA™ class, reading the JAVA™ class hierarchy, and determining whether the second JAVA™ class is represented in the JAVA™ class hierarchy.

As a JAVA™ virtual machine one embodiment of the invention comprises an internal class representation suitable for representation of a JAVA™ class in a JAVA™ virtual machine. The internal class representation includes a JAVA™ class hierarchy for the JAVA™ class, wherein the JAVA™ class hierarchy represents all the parent classes of the JAVA ™ class in a hierarchical relationship.

As a computer readable media including computer program code for type checking JAVA™ class types, one embodiment of the invention includes computer program code for receiving a first and a second reference, the first and second reference respectively referencing a first and a second JAVA™ class, computer program code for finding a class representation for the first JAVA™ class, the class representation including a JAVA™ class hierarchy for the first JAVA™ class, the JAVA™ class hierarchy including all the parents of the first JAVA™ class, computer program code for reading the JAVA™ class hierarchy, and computer program code for determining whether the second JAVA™ class is represented in the JAVA™ class hierarchy.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As described in the background section, the JAVA™ programming environment has enjoyed widespread success. Therefore, there are continuing efforts to extend the breadth of JAVA™ compatible devices and to improve the performance of such devices. One of the most significant factors influencing the performance of JAVA™ based programs on a particular platform is the performance of the underlying virtual machine. Accordingly, there have been extensive efforts by a number of entities to improve performance in JAVA™ compliant virtual machines.

Accordingly, improved techniques for type checking in JAVA™ computing environments are disclosed. As will be appreciated, the techniques can be used by a JAVA™ virtual machine to efficiently perform type checking. In one embodiment, a JAVA™ class hierarchy is implemented in an internal class representation. The JAVA™ class hierarchy represents the hierarchical relationship of the parent classes for the JAVA™ class. The JAVA™ class hierarchy can be implemented, for example, as an array of class references. The array of class references can be used to efficiently perform type checking in JAVA™ computing environments. As a result, the performance of JAVA™ virtual machines, especially those operating with limited resources, can be significantly enhanced.

Embodiments of the invention are discussed below with reference to FIGS. 2–5. However, those skilled in the art will readily appreciate that the detailed description given herein with respect to these figures is for explanatory purposes only as the invention extends beyond these limited embodiments.

Figure 2:
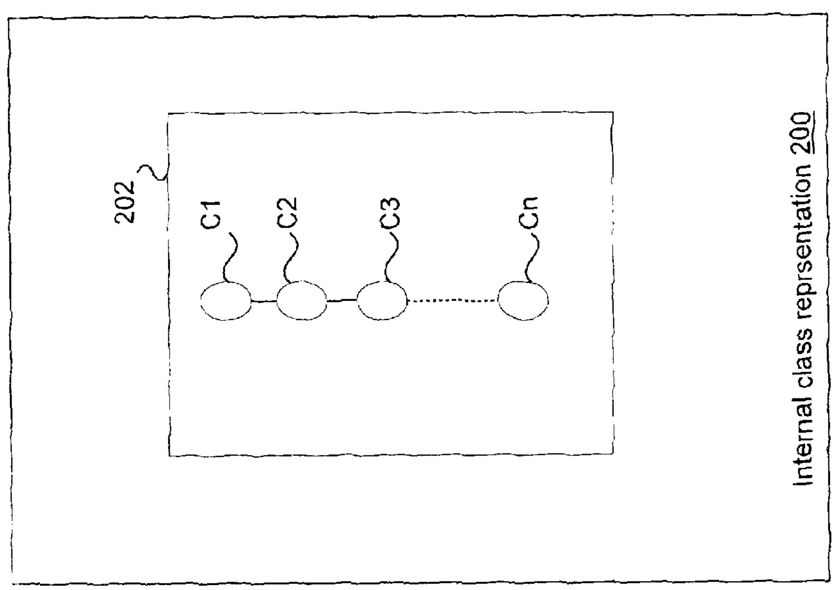
FIG. 2 illustrates an internal class representation in accordance with one embodiment of the invention.

FIG. 2 illustrates an internal class representation 200 in accordance with one embodiment of the invention. The internal class representation 200 is suitable for representation of a JAVA™ class in a JAVA™ virtual machine. As shown in FIG. 2, the internal class representation 200 includes a JAVA™ class hierarchy field 202. The JAVA™ class hierarchy field 202 represents a class hierarchy for the JAVA™ class represented by the internal class representation 200. In other words, the JAVA™ class hierarchy field 202 represents the hierarchical relationship between the JAVA™ class and its parents (JAVA™ classes C1, C2, . . . , CN). Thus, the JAVA™ class represented by the internal class representation 200 is derived from JAVA™ class C1. JAVA™ class C2 is derived from JAVA™ class C1 and so forth. Accordingly, the JAVA™ class CN represents the JAVA™ super class "/JAVA™/Lang/Object".

Figure 3:
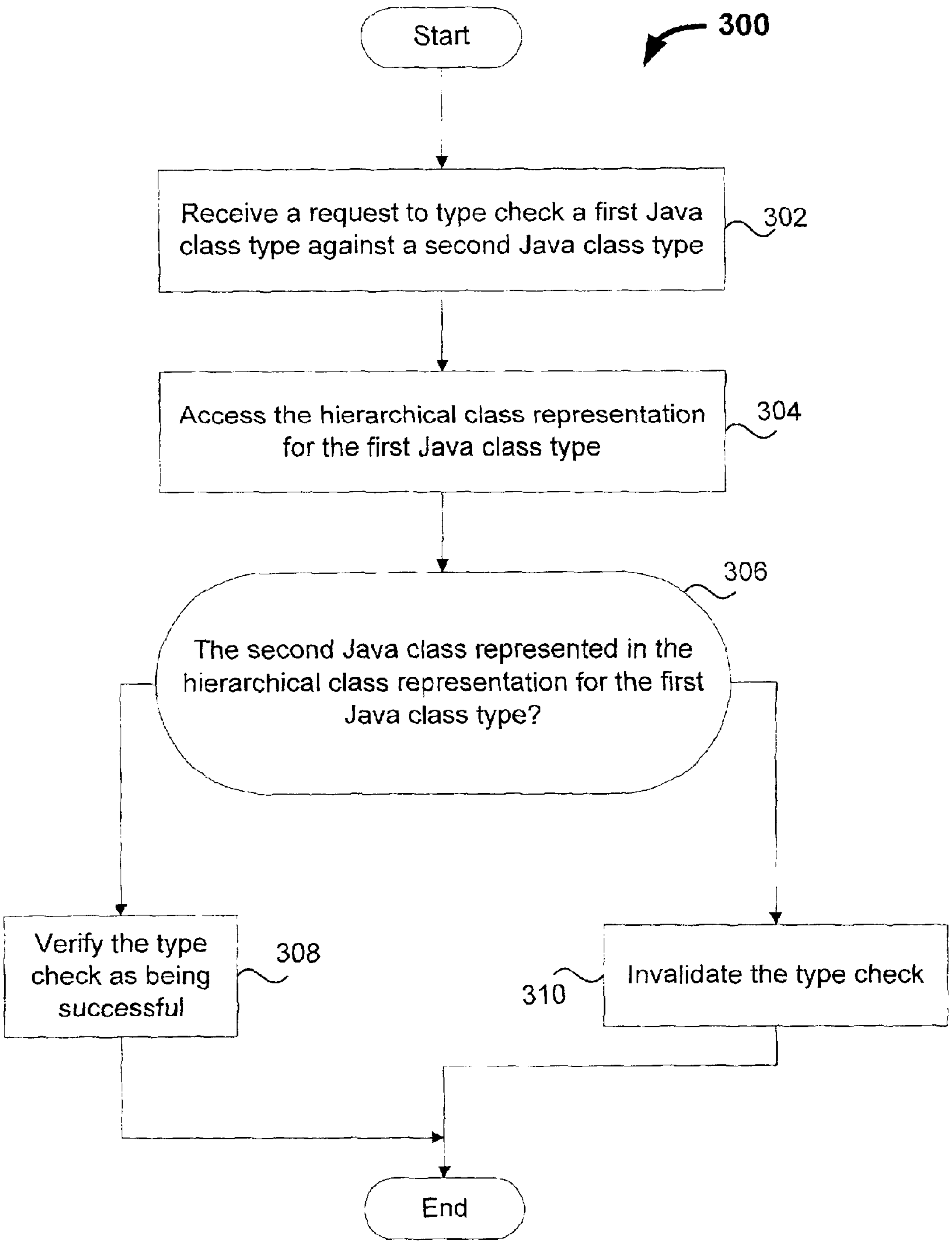
FIG. 3 illustrates a method for type checking JAVA™ class types in accordance with one embodiment of the invention.

The JAVA™ class hierarchy field 202 of the internal class representation 200 can be used to efficiently perform type checking in JAVA™ computing environments. FIG. 3 illustrates a method 300 for type checking JAVA™ class types in accordance with one embodiment of the invention. The method 300 can be used by a JAVA™ virtual machine to perform type checking. Initially, at operation 302, a request for type checking a first JAVA™ class against a second JAVA™ class is received. Next, at operation 304, the hierarchical class representation for the first JAVA™ class type is accessed. Thereafter, at operation 306, a determination is made as to whether the second JAVA™ class is represented in the hierarchical class representation of the first JAVA™ class. If it is determined at operation 308 that the second JAVA™ class is represented in the hierarchical class representation of the first JAVA™ class type, the method 300 proceeds to operation 308 where the type check is verified as being successful. However, if it is determined at operation 308 that the second JAVA™ class is not represented in the hierarchical class representation of the first JAVA™ class type, the method 300 proceeds to operation 310 where the type check is invalidated. The method 300 ends following either the validation performed at operation 308 or the invalidation performed at operation 310.

Figure 1A:
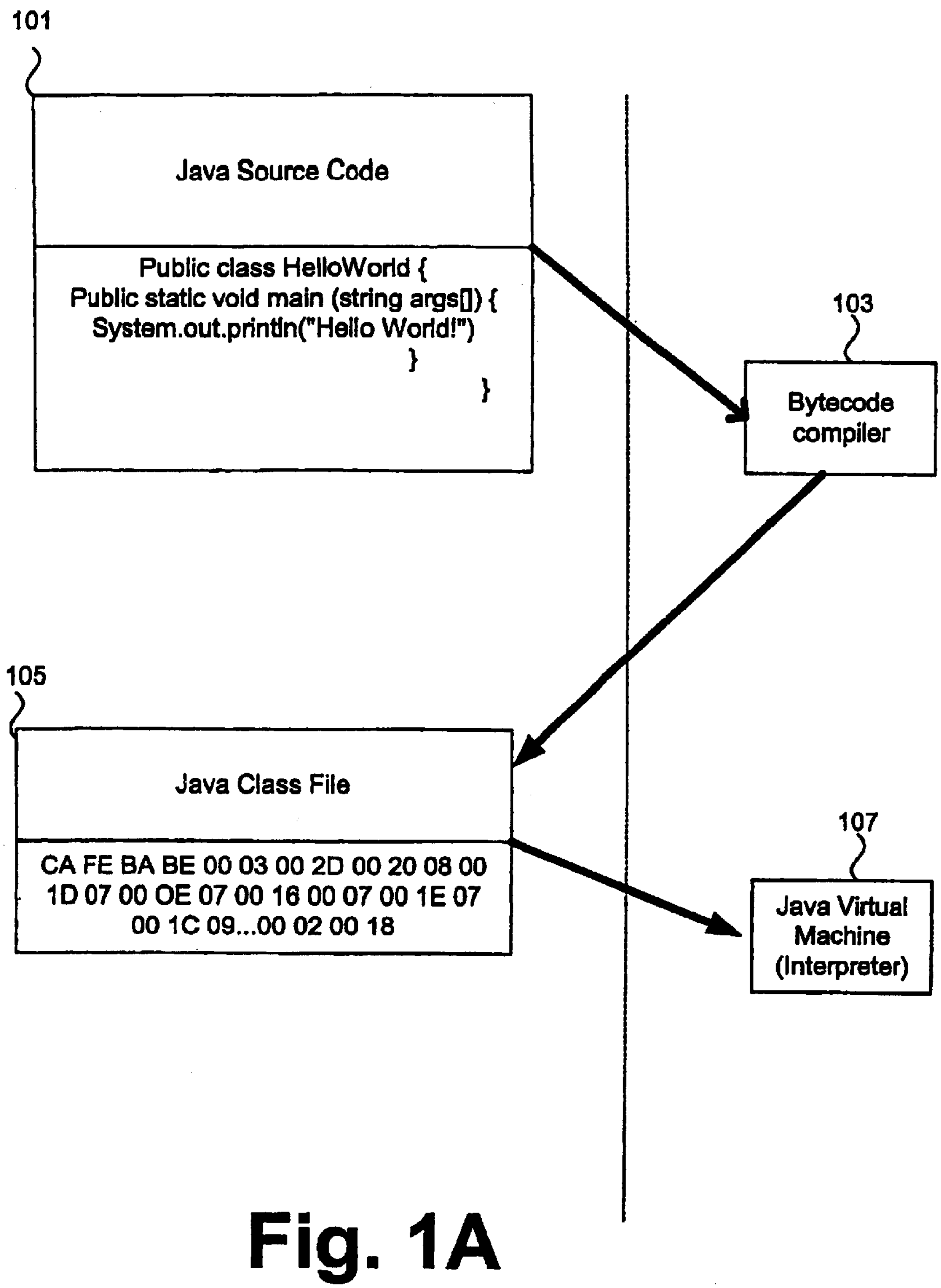
FIG. 1A shows a progression of a simple piece of a JAVA™ source code through execution by an interpreter, the JAVA™ virtual machine.
Figure 1B:
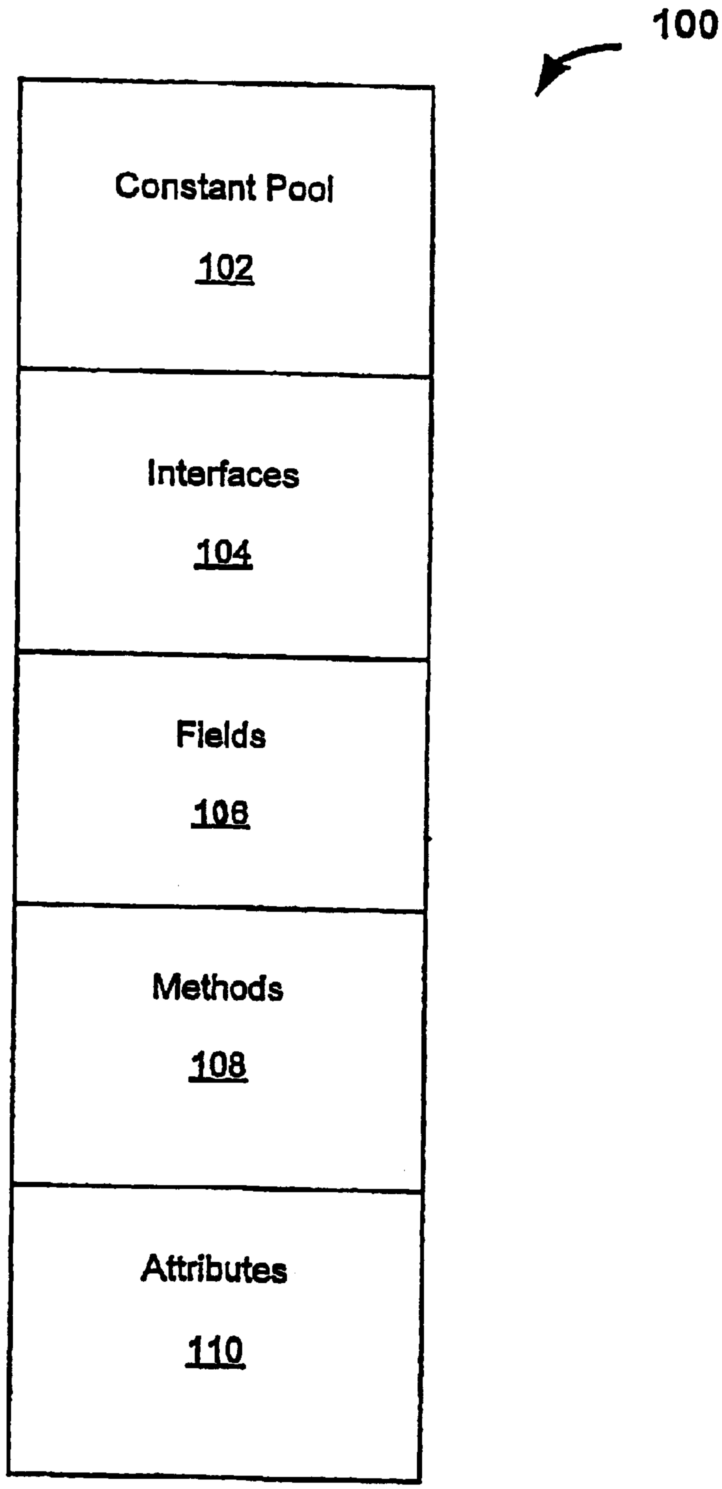
FIG. 1B illustrates a simplified class file.
Figure 4:
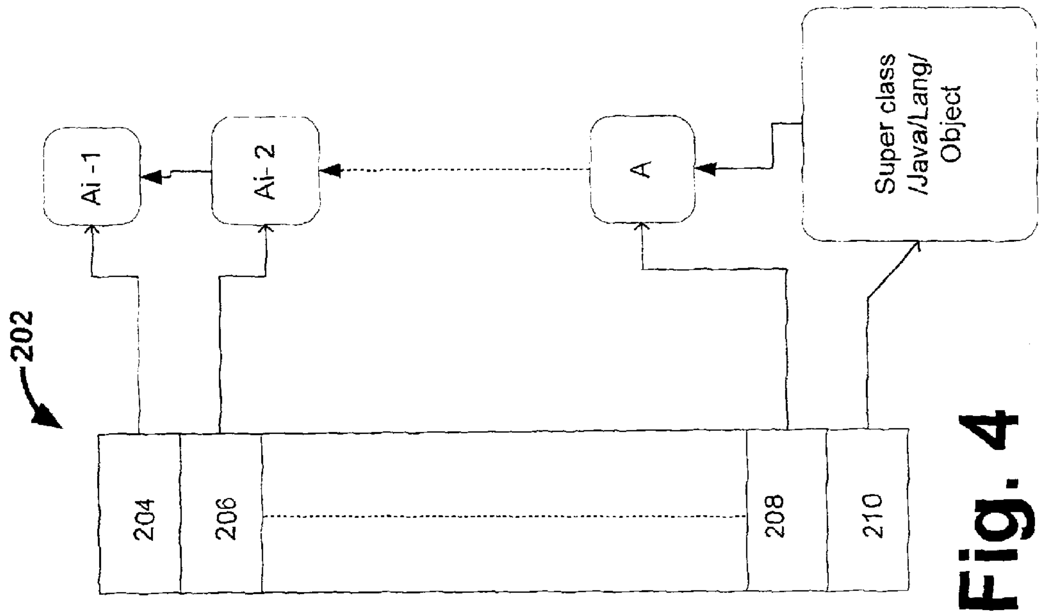
FIG. 4 illustrates a JAVA™ class hierarchy field in accordance with one embodiment of the invention.

FIG.4 illustrates a JAVA™ class hierarchy field 202 in accordance with one embodiment of the invention. In the described embodiment, the JAVA™ class hierarchy field 202 is implemented as an array of class references 204, 206, 208, and 210 which respectively reference JAVA™ classes Ai-1, Ai-2, A, and super class "/JAVA™/Lang/Object". As such, the JAVA™ class hierarchy field 202 indicates that the JAVA™ class Ai-1 is the parent of the JAVA™ class Ai, the JAVA™ class Ai-2 is the parent of the JAVA™ class Ai-1, and so on. As will be appreciated, the JAVA™ class hierarchy field 202 can be accessed efficiently by a JAVA™ virtual machine. Accordingly, type checking can quickly be performed in JAVA™ computing environments.

Figure 5:
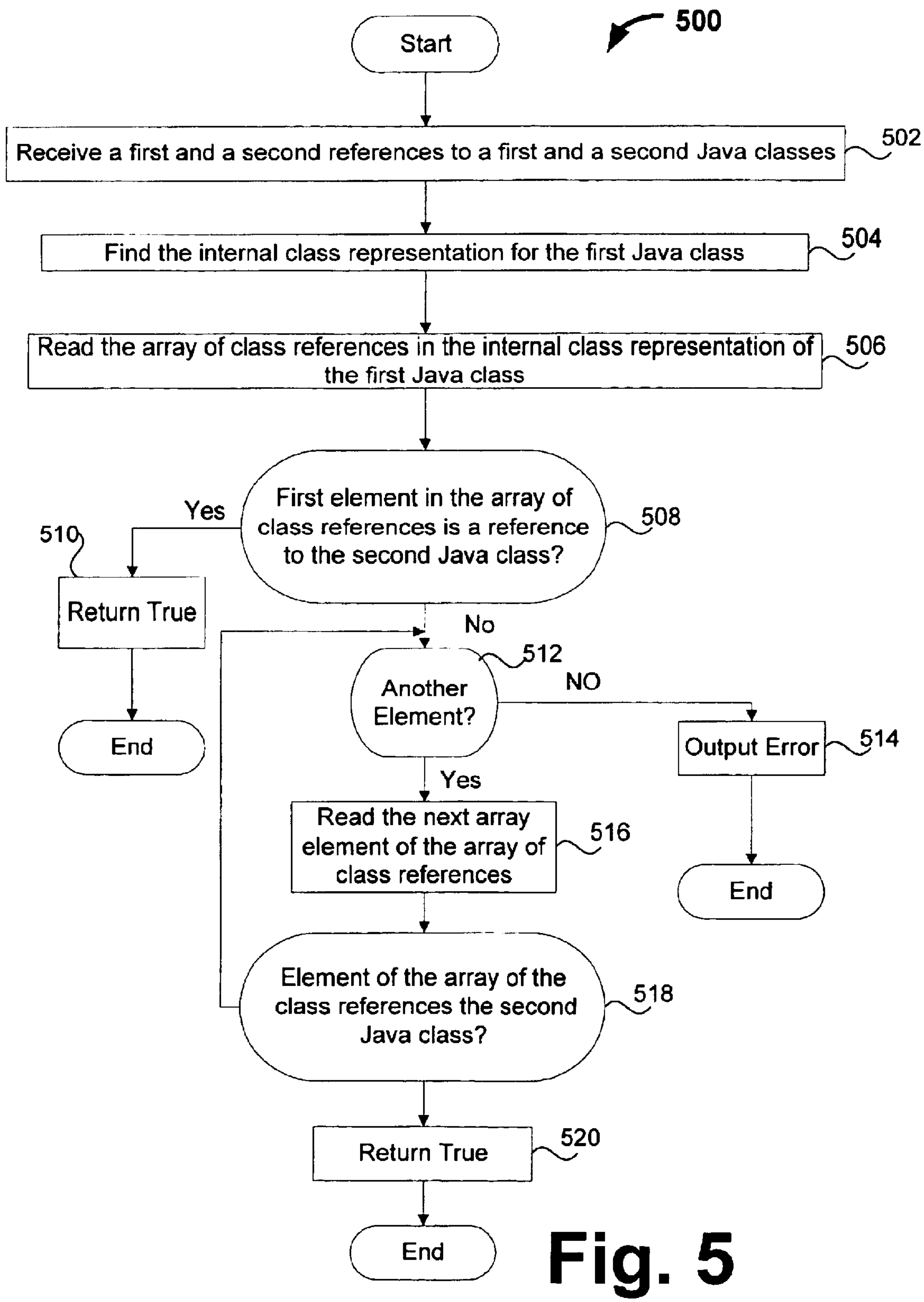
FIG. 5 illustrates a method for type checking JAVA™ class types in accordance with another embodiment of the invention.

FIG.5 illustrates a method 500 for type checking JAVA™ class types in accordance with one embodiment of the invention. The method 500 can be used by a JAVA™ virtual machine to perform type checking. Initially, at operation 502, first and a second references are received. The first and second references respectively reference first and second JAVA™ class types for which type checking is desired. Next, at operation 504, the internal class representation for the first JAVA™ class is found. Thereafter, at operation 506, the array of class references in the internal class representation is read.

Accordingly, a determination is made at operation 508 as to whether the first element in the array of class references is a reference to the second JAVA™ class. If it is determined at operation 508 that the first element in the array of class references is a reference to the second JAVA™ class, the method 500 proceeds to operation 510 where "True"is returned. The method 500 ends following operation 510.

On the other hand, if it is determined at operation 508 that the first element in the array of class references is not a reference to the second JAVA™ class, the method 500 proceeds to operation 512 where it is determined whether there is at least one more element in the array of class references. If it is determined at operation 512 that there is not at least one more element in the array of class references, the method 500 proceeds to operation 514 where an error is output. The method 500 ends following operation 514. However, if it is determined at operation 512 that there is at least one more element in the array of class references, the method 500 proceeds to operation 516 where the next array element in the array of class references is read. Next, at operation 518, a determination is made as to whether the first element in the array of class references is a reference to the second JAVA™ class.

If it is determined at operation 518 that the first element in the array of class references is not a reference to the second JAVA™ class, the method 500 proceeds to operation 512 where it is determined whether there is at least one more element in the array of class references. Thereafter, the method 500 proceeds in a similar manner as discussed above. However, if it is determined at operation 518 that the first element in the array of class references is a reference to the second JAVA™ class, the method 500 proceeds to operation 520 where "True"is returned. The method 500 ends following operation 520.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of type checking class types by a virtual machine, said method comprising:

generating, at load time, when a first class is loaded into the virtual machine, a class hierarchy for said first class, wherein said class hierarchy represents all parent classes of said first class in a hierarchical parent to child relationship, and wherein said class hierarchy is arranged as a first array of parent references to consecutive parents of said first class organized in accordance with said hierarchical relationship;

loading, at load time, said class hierarchy in a first internal class representation of said first class inside said virtual machine, thereby enabling all parents of said first class to be determined without referencing another internal class representation of the parent classes;

receiving, by said virtual machine, at runtime after said internal class representation has been loaded inside said virtual machine, a first and a second reference, wherein said first and second references respectively reference said first and a second class;

finding, by said virtual machine at runtime, said first internal class representation for said first class;

reading said class hierarchy in said first internal class representation; and determining whether said second class is represented in said class hierarchy by accessing said first array of parent references.

2. A method as recited in claim 1, wherein said virtual machine is implemented in an embedded system.

3. A method as recited in claim 1, wherein said method further comprises:

returning a first value when said determining determines that said second class is represented in said class hierarchy by accessing said first array of parent references; and returning a second value when said determining determines that said second class is not represented in said class hierarchy by accessing said first array of parent references.

4. A method as recited in claim 1, wherein said accessing of said first array comprises:

updating an index of said first array; and accessing said array with said updated index.

5. A method as recited in claim 1, wherein said first class is associated with a platform independent programming language.

6. A method as recited in claim 1, wherein said method further comprises:

determining whether said second class is represented in said class hierarchy by indexing an element in said first array of parent reference; and repeating said determining of whether said second class is represented in said class hierarchy by indexing another element in said first array of parent reference.

7. A computer system including at least one processor for type checking class types, wherein said computer system performs:

generating, at load time, when a first class is loaded into said virtual machine, a class hierarchy for said first class, wherein said class hierarchy represents all parent classes of said first class in a hierarchical parent to child relationship, and wherein said class hierarchy is arranged as a first array of parent references to consecutive parents of said first class organized in accordance with said hierarchical relationship;

loading, at load time, said class hierarchy in a first internal class representation of said first class inside said virtual machine, thereby enabling all parents of said first class to be determined without referencing another internal class representation of the parent classes;

receiving at runtime after said internal class representation has been loaded inside said virtual machine, a first and a second reference, said first and second references respectively reference wherein said first and a second class;

finding at runtime, said first internal class representation for said first class;

reading said first class hierarchy in said first internal class representation; and determining whether said second class is represented in said class hierarchy by accessing said first array of parent references.

8. A computer system as recited in claim 7, wherein said virtual machine is implemented in an embedded system.

9. A computer system as recited in claim 7, wherein said computer system further performs:

returning a first value when said determining determines that said second class is represented in said class hierarchy by accessing said first array of parent references in said first class hierarchy; and returning a second value when said determining determines that said second class is not represented in said class hierarchy by accessing said first array of parent references.

10. A computer system as recited in claim 7, wherein said accessing of said first array comprises:

updating an index of said first array; and accessing said array with said updated index.

11. A computer system as recited in claim 7, wherein said first class is associated with a platform independent programming language.

12. A computer system as recited in claim 7, wherein said computer system further performs:

determining whether said second class is represented in said class hierarchy by indexing an element in said first array of parent references; and repeating said determining of whether said second class is represented in said class hierarchy by indexing another element in said first array of parent references.

13. A computer readable medium including computer program code for type checking class types, comprising:

computer program code for generating, at load time, when a first class is loaded into said virtual machine, a class hierarchy for said first class, wherein said class hierarchy represents all parent classes of said first class in a hierarchical parent to child relationship, and wherein said class hierarchy is arranged as a first array of parent references to consecutive parents of said first class organized in accordance with said hierarchical relationship;

computer program code for loading, at load time, said class hierarchy in a first internal class representation of said first class inside said virtual machine, thereby enabling all parents of said first class to be determined without referencing another internal class representation of the parent classes;

computer program code for receiving at runtime after said internal class representation has been loaded inside said virtual machine, a first and a second reference, wherein said first and second references respectively reference said first and a second class;

computer program code for finding at runtime, said first internal class representation for said first class;

computer program code for reading said class hierarchy in said first internal class representation; and computer program code for determining whether said second class is represented in said class hierarchy by accessing said first array of parent references.

14. A computer readable medium as recited in claim 13, wherein said virtual machine is implemented in an embedded system.

15. A computer readable medium as recited in claim 13, wherein said computer program code further comprises:

returning a first value when said determining determines that said second class is represented in said class hierarchy by accessing said first array of parent references; and returning a second value when said determining determines that said second class is not represented in said class hierarchy by accessing said first array of parent references.

16. A computer readable medium as recited in claim 13, wherein said accessing of said first array comprises:

updating an index of said first array; and accessing said array with said updated index.

17. A computer readable medium as recited in claim 13, wherein said first class is associated with a platform independent programming language.

* * * * *

UNITED STATES PATENT AND TRADEMARK OFFICE

CERTIFICATE OF CORRECTION

PATENT NO. : 6,948,156 B2

DATED : September 20, 2005
INVENTOR(S) : Stepan Sokolov

It is certified that error appears in the above-identified patent and that said Letters Patent is hereby corrected as shown below:

Title page,
Item [75], Inventor, change “Stephan Sokolov” to -- Stepan Sokolov --.

Column 6,
Lines 53 and 55, change “parent reference” to -- parent references --.

Signed and Sealed this

Twenty-eighth Day of March, 2006

JON W. DUDAS
*Director of the United States Patent and Trademark Office*